(12) United States Patent
Lee et al.

(10) Patent No.: US 6,704,800 B1
(45) Date of Patent: Mar. 9, 2004

(54) SYSTEM AND METHOD FOR MESSAGE LOOP DETECTION AND CORRECTION

(75) Inventors: Jangsik Lee, Yorba Linda, CA (US); Bruce Rethwisch, Fullerton, CA (US); Loita Jahnsson, Stockholm (SE); Eric Turesson, Huddinge (SE); Björn Andersson, Hagersten (SE)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/415,934

(22) Filed: Oct. 7, 1999

(51) Int. Cl.[7] .................................................. G06F 9/46
(52) U.S. Cl. ........................ 709/313; 709/319; 709/224
(58) Field of Search ............................... 709/310–332, 709/224

(56) References Cited

U.S. PATENT DOCUMENTS 5,838,915 A * 11/1998 Klausmeier et al. ........ 709/215
5,937,205 A * 8/1999 Mattson et al. ................ 710/6
6,222,822 B1 * 4/2001 Gerardin et al. ............ 370/230

* cited by examiner

*Primary Examiner*—John Follansbee
*Assistant Examiner*—Lewis A. Bullock, Jr.

(57) ABSTRACT

The present invention provides a system and method to identify message sequences occurring in a computer or communication system. The present invention defines and detects undesirable sequence of messages, suppresses generation of undesirable sequences, and, if necessary, causes the termination of the execution of generating program module, or otherwise inhibiting the source of the undesirable message sequence. A report, indicating the messages generated as part of the undesirable message sequence and the generating program module and related information is provided. Message sequences transmitted to and from one program module to another program module may be tracked. In tracking messages, a starting message point may be set and all subsequent message transmittals may be included in a message depth and sequence depth count.

21 Claims, 3 Drawing Sheets

SYSTEM AND METHOD FOR MESSAGE LOOP DETECTION AND CORRECTION

BACKGROUND OF THE PRESENT INVENTION

1. Field of the Invention

The present invention relates generally to computer and communication systems. More particularly, the present invention relates to a system and method for message management, including the detection, identification, and suppression of undesirable message sequences.

2. Background and Objects of the Present Invention

In computer and communications systems which generally rely on many millions of programmed instruction for proper operation, system functionality is almost always divided into many distinct program modules with a specific functionality assigned to each module. In order to carry out operation of a system as a whole, however, program modules must communicate information to users and other program modules, report status, pass and receive arguments or parameters, and so on, so that the diverse modules may function properly as an integrated system.

Program modules may communicate with each other in a variety of ways. For program modules which exist, for example, as a subroutine or function, one program module may reference other program modules by subroutine call, function call and/or procedure call. As a result, the calling and called programs are related with each other hierarchically, with the calling module as superordinate and the called module as subordinate. Program modules which are not related through a calling/called relationship may communicate with each other through messages or signals generated, for example, as events occur or as errors are encountered.

Intercommunication between program modules using messages or signals is particularly prevalent in real-time environments where program modules run as independent, concurrent tasks or processes which detect and respond to real time events by generating associated messages or signals reporting events or status, making requests and the like. In both examples, whether through subroutine calls or through signals or messages, the purpose of such inter-module communication is to give and receive information, to request information, and to fetch information, all the while continuing the sequence of execution within the computer processor in order to achieve the functionality of the entire system.

From the viewpoint of an operating system of a computer or communication system whose duties include scheduling of program execution, communications between program modules must be regulated to control or limit the amount of time allotted for the execution of any segment of a program module. As is well understood in the arts, a program module can neither make an infinite number of subroutine calls nor generate an infinite number of messages before interference from the operating system occurs in the form of an interrupt or other request for processor service by other program segments in the processor execution queue. Moreover, in addition to temporal limitations, system limitations, such as available memory, for example, may be present which force the operating system to limit the scope of execution of a program module.

Memory allocated for the purpose of storing parameters and other information associated with subroutine calling is commonly referred to as the "stack", which, of course, is subject to size limitations. Accordingly, subroutine or procedure call nesting is conventionally regulated by the operating system based upon size of the stack allocated for storing the addresses of called subroutines and return addresses of the calling program module. The parameter information or arguments provided to a subroutine from a is calling program module may also be passed through, a predetermined location within the stack. When the stack runs out of space, no further subroutine operations can occur and the operating system normally terminates the execution of the entire program with an error description, such as stack overflow/underflow. The execution of a program may also be aborted if a program module generates thousands of messages in a very short time, e.g., less than a second. Messages or signals generated by a program module are normally stored in a message buffer or message queue in memory which is also subject to size limitations. When a message buffer memory area runs out of free space, the operating system normally terminates the execution of the program module with an appropriate message.

Operating systems may further affect the execution of a program module by using a priority scheme. In such a system, some program modules have a higher priority than other program modules, with execution of higher priority program modules having preference over lower priority program modules. As a result, messages from higher priority program modules are processed prior to messages from lower priority program modules.

Despite operating system measures to limit the temporal scope of execution and the amount of resources used by any one program module at any one time, problems persist in conventional computer and communication system environments in that:

(1) an errant program module can generate a never-ending message sequence;

(2) an infinite message sequence generated by a higher execution priority program module will deprive a lower execution priority program module of execution time;

(3) messages generated by lower execution priority program modules awaiting execution time will occupy and perhaps overflow the message buffer memory area; and (4) message buffer memory area overflow may cause the termination of other program modules, possibly leading to system failure.

Attempts in the prior art to address and resolve some of the above and related problems have included the following measures:

(1) limiting the number of sequential subroutine calls made by a program module, e.g., by limiting stack size;

(2) limiting the number of messages which may be generated by a program module during a thread of execution;

(3) discarding certain messages arriving at a process during execution conditions declared unfavorable to the reception of those messages; and (4) discarding messages when the message buffer memory area is saturated or full or about to overflow.

While the attempts at correction measure may slow the rate at which such error conditions occur or prevent such errors under limited circumstances, the computer or communication system will generally encounter an unrecoverable failure if, for example, lower execution priority program modules are deprived of execution time for any length of time significant from the waiting program module's frame of reference or, for example, the message buffer memory area becomes saturated.

In general, undesirable sequences of messages which unnecessarily consume processor time and/or buffer area resources are a nuisance which operating systems of the prior art do not provide a solution for. The consequences of program modules generating undesirable message sequences are often that the entire system is rendered inoperable. Although some operating systems provide limited corrective and preventive measures in the form of limiting buffer sizes and number of messages capable of being generated, such measures in themselves may seriously degrade system performance and may nonetheless fail to be fully effective. Such problems may be particularly acute for communications systems which service telephone traffic or computer systems servicing electronic commerce or other critical functions.

In view of the foregoing, it would, therefore, be desirable to provide a system and method which overcomes the above-described inadequacies and shortcomings of conventional techniques.

More particularly, it would be desirable to provide a system and method for detecting and correcting undesirable message sequences in an efficient and cost-effective manner.

SUMMARY OF THE INVENTION

The present invention describes a system and method to identify message sequences, particularly unwanted or spurious message sequences, that occur in a computer or communication system or any related components of such systems. The present invention defines and detects these undesirable message sequences and preferably removes the cause. A report may then be created, indicating the messages generated, the sequence of the messages and the generating program module and related information.

In accordance with one aspect of the present invention, message sequences transmitted to and from one program module to another program module are tracked, including message sequences transmitted to and from an operating system extension. Such tracking may include, but is not limited to, a function of setting a starting message point, and counting all subsequent message transmittals or transmissions. Further, tracking in the present invention may be implemented as an operating system extension, as an independent operating system program module, and may further be implemented in a hardware, software, firmware or programmable logic device which may also be configured by conventional programming means.

According to a further aspect of the present invention, an operating system extension, for example, may be configured to detect an undesirable number of messages, e.g., a message loop. The operating system extension may be configured to detect message looping of a finite or an infinite nature based on the detection of a predetermined number of sequential messages, i.e., a limit or threshold. The operating system extension of the present invention may further be configured to detect a sequence of messages which exhibits characteristics beyond what would be expected. Detection in the present invention may be implemented as an operating system extension, as an independent operating system program module, and may further be implemented in a hardware, software, firmware or programmable logic device which may also be configured by conventional programming means.

In accordance with yet another aspect of the present invention, the operating system extension, for example, may be configured to define what characterizes message looping. The operating system extension of the present invention may be configured to define message looping of a finite or infinite nature based on a predetermined number of messages in order. The operating system extension of the present invention may further be configured to define a sequence of messages which is beyond the expected sequence norm. Defining, in accordance with the present invention, may be implemented as an operating system extension, as an independent operating system program module, and may further be implemented in a hardware, software, firmware or programmable logic device which may also be configured by conventional programming means.

According to still a further aspect of the present invention, the operating system extension may be configured to terminate the execution associated with an undesirable sequence of messages or message loop. The operating system extension of the present invention may further be configured to provide a report including a sample subset of the terminated message sequence or message loop. Termination in accordance with the present invention may be implemented as an operating system extension, as an independent operating system program module, and may further be implemented in a hardware, software, firmware or programmable logic device which may also be configured by conventional programming means.

The aforedescribed objects, as well as other objects, features, and advantages, of the present invention will become readily apparent from the following Detailed Description, which is to be read in conjunction with the appended Drawings.

BRIEF DESCRIPTION OF THE DRAWINGS

In order to facilitate a fuller understanding of the present invention, reference is now made to the appended Drawings. These Drawings should not be construed as limiting the present invention, but are intended to be exemplary only.

DETAILED DESCRIPTION OF A PRESENTLY PREFERRED EXEMPLARY EMBODIMENTS

The present invention will now be described more fully hereinafter with reference to the invention as shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
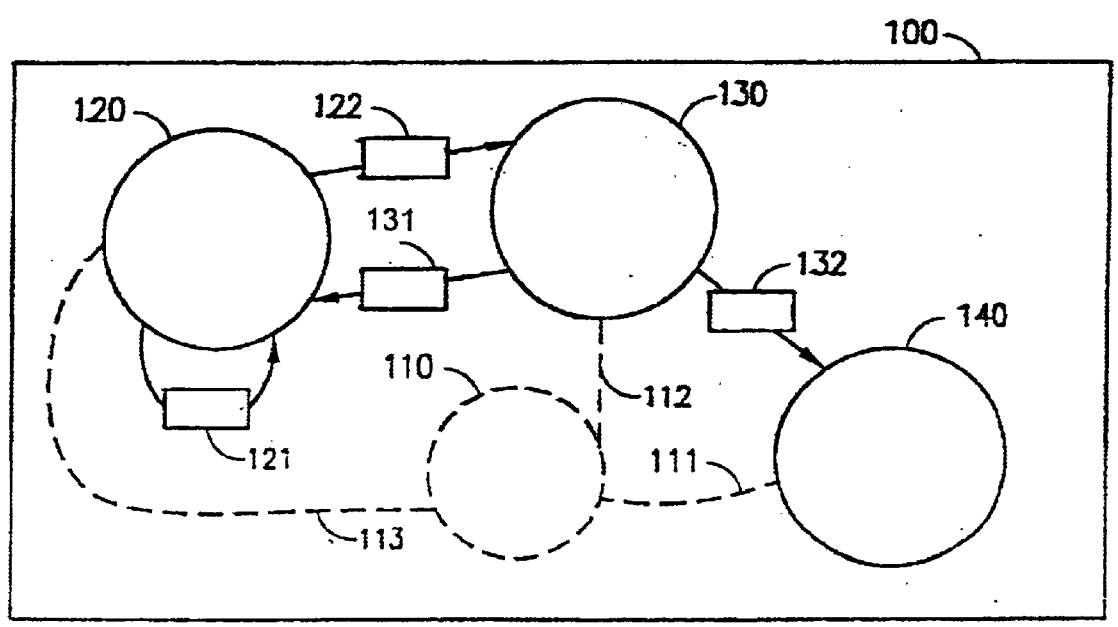
FIG. 1 is a diagram illustrating an exemplary operating environment, exemplary operating system, exemplary program modules, and exemplary messages in accordance with the present invention.

Referring to FIG. 1, there is shown an exemplary operating environment, generally designated by the reference numeral 100, which may be utilized in practicing the principles of the present invention in a computer system, a communication system, and the like. Operating environment 100 may be considered the operating environment for the execution of a number of exemplary program modules 120, 130, and 140, each operating under the control of an exemplary operating system 110, which also includes processor and memory resources.

Exemplary operating system 110 may be configured through an operating system extension to monitor message traffic such as messages 121, 122, 131, 132 which may be passed between exemplary program modules 120, 130, and 140, and, as illustrated in the case of message 121, may be passed from program module 120 back to itself.

Exemplary operating system 110 may control execution of exemplary program modules 120, 130, and 140 within operating environment 100 by the exemplary control lines 111, 112, and 113. Control lines 111, 112, and 113 represent the control relationship between exemplary operating system 110 and exemplary program modules 120, 130, and 140. In a preferred embodiment of the present invention, operating system 110 controls the execution of instructions associated with exemplary program modules 120, 130, and 140 on a processor and other hardware, software, firmware and system resources such as memory which make up operating environment 100.

In an alternative embodiment, the present invention is realized wholly or partially within separate hardware, software and modules, which are nonetheless integrated with operating system 110 within operating environment 100. In such an embodiment, exemplary control lines 111, 112, 113 may be implemented, for example, as one or more lines, e.g., one or more bidirectional data lines, control lines, and the like, for the purpose of providing operating system 110 with the ability to monitor and control the generation of the various exemplary messages 121, 122, 131, 132.

Figure 2:
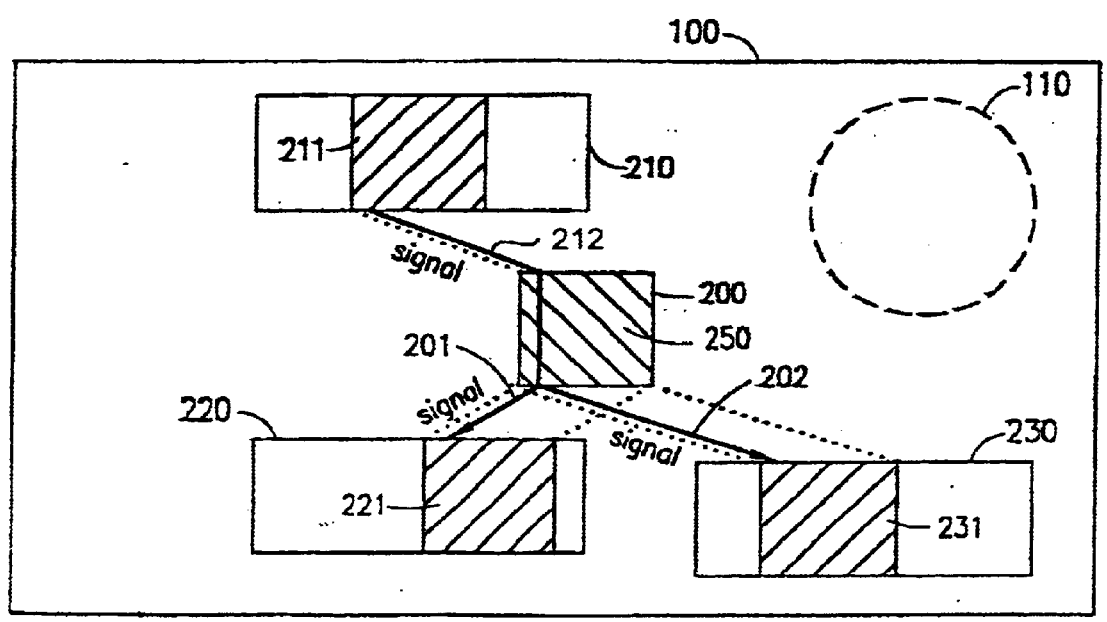
FIG. 2 is a diagram illustrating an exemplary message passing interface, exemplary program modules, and exemplary messages in accordance with the present invention.

Referring now to FIG. 2, there is shown a further example of message passing using a physical memory component 200 within a computer, and various signals, designated by reference numerals 201, 202, and 212. Within operating environment 100, a sending program module 210 has a region 211 or portion of overall address space reserved for messaging. In operation, when a message is desired to be sent, the message contents are placed in a location in region 211, which maps to a shared physical segment 250 of physical memory 200, as is understood to one skilled in the art. When the contents of the message are in place, signal 212 is sent to one or more receiver program modules, for example, program modules 220 and 230, as illustrated in FIG. 2. Upon receiving signals 201 and 202, program modules 220 and 230 may then read the appropriate addresses of regions 221 and 231 to retrieve the message.

In accordance with the teachings of the present invention, operating system 110 monitors, for example, the issuance of signals 201, 202, and 212, and accesses within physical segment 250 of physical memory 200 to maintain message sequence depth count as will be described in greater detail hereinafter. In addition to message passing, illustrated as merely an exemplary approach, virtually any other message passing approach may be monitored and controlled in accordance with the teachings of the present invention.

Figure 3:
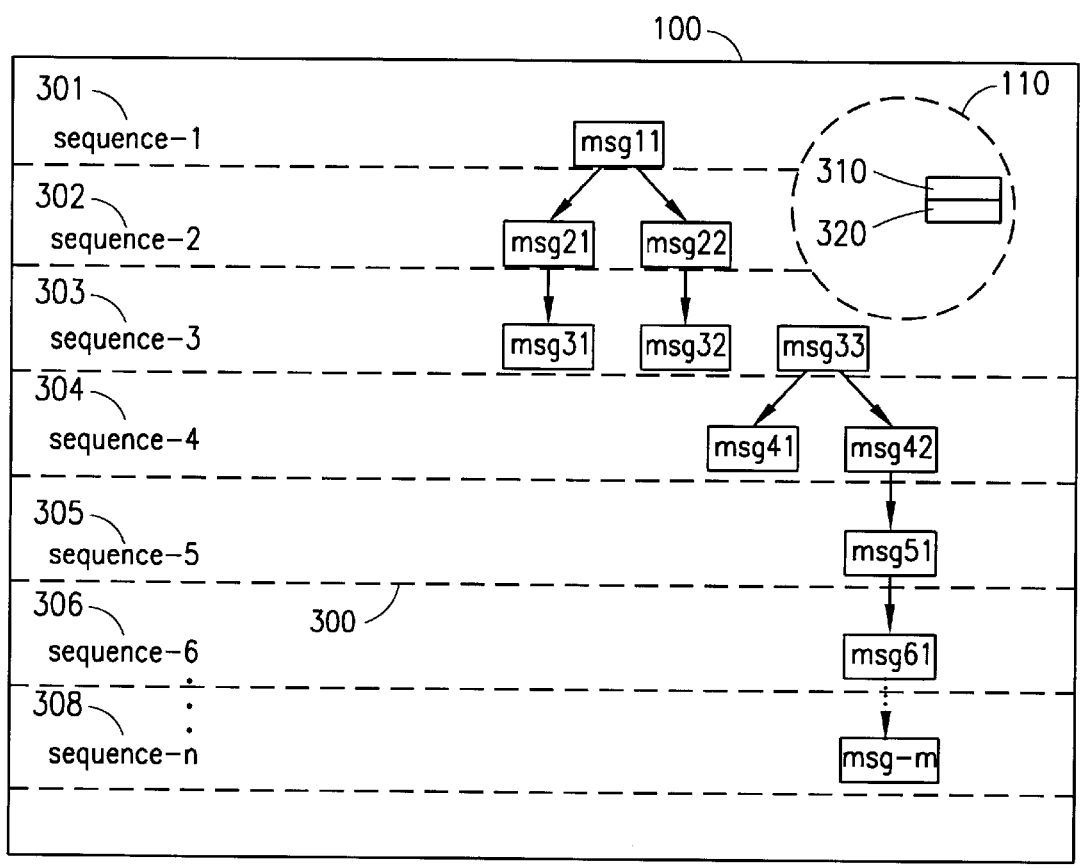
FIG. 3 is a diagram illustrating exemplary message sequences in an exemplary operating environment using exemplary operating system, exemplary program modules, and exemplary messages in accordance with the present invention.

Referring now to FIG. 3, there are shown several exemplary sequences of messages which may be tracked in accordance with the present invention. In addition to monitoring message traffic by tracking message queue depth, the present invention may provide significant additional advantages by tracking message sequence depth. For example, within operating environment 100, operating system 110 may monitor the issuance of one or more message sequences, generally designated by the reference numeral 300, from one or more program modules or like sources of messages. To further simplify the illustration in FIG. 3, the program modules which issue, receive, and subsequently issue further messages are not shown. With reference again to FIG. 3, message sequence-1 depth or level 301 contains a message generated by a program module and received by the same or a different program module, resulting in a first level message msg11. Herein, messages are designated msgxy where "x" represents the sequence depth count, and "y" represents the message depth count corresponding to each message. Accordingly, for msg11, operating system 110 now has a sequence depth count of one and a message depth count of one.

The receipt of msg11 stimulates the issuance of two additional messages, forming a message sequence-2 depth 302, which includes msg21 and msg22 therein. It should be noted that messages issued in accordance with the present invention are delivered to program modules based on priority levels, which may further be assigned to messages. Higher priority messages are preferably delivered prior to lower priority messages. When there are no higher level messages queued, lower level messages are then processed. As is illustrated in FIG. 3, a receiving program module can create additional messages associated with, for example, the performance of a task associated with the message, or, for example, the reporting of a status if a received message is a request for status. These newly-created messages are subsequently delivered to other program modules where more subsequent messages can be created. Generally, a specific program module creates the same priority level message as that of a corresponding received message.

Referring again to FIG. 3 and message sequence-1 depth 301 illustrated therein, msg11 causes a program module to issue two messages shown as msg21 and msg22 in message sequence-2 depth 302. Receipt of msg21, in turn, causes the issuance of msg31, while msg22 causes two third level messages to be issued, i.e., messages msg32 and msg33. Msg31, msg32, and msg33 form message sequence-3 depth 303 having a message depth of three. Both the sequence depth, three, and the sequence number, three may be tracked by operating system 110.

With reference again to FIG. 3, msg33 subsequently causes the issuance of msg41 and msg42. It should be noted that the issuance of a message, which requires a timer operation to begin before an action is to be taken by a receiving program module and subsequent messages caused to be issued upon the expiration of the time, may be considered unrelated. That is, such subsequent messages would be considered by the system to represent the beginning of a new one or more sequences. As an example, assume msg41 was configured to cause a receiving program module to begin a timer operation before any subsequent messages would likely issue. Operating system 110 in accordance with the present invention would not include subsequent messages, for example, in sequence-5 depth 305. Intead, when messages issue upon the expiration of a timer operation invoked by msg41, the subsequent messages would be dealt with as part of a new sequence. Referring back to FIG. 3 and message sequence-4 depth 304, it can be appreciated that msg42 causes the issuance of msg51 which subsequently causes the issuance of msg61 in sequence-6 depth 306, and so on until terminating with msgnn at sequent-n depth 308. One or more message sequences 300 may continue until a sequence depth is reached. Such a limit may be set in operating system 110 according to known operational limitations and may be reconfigurable to practical system limitations, depending upon the type of processor or processors or scope of the Messaging activity of the system. It should be understood that a limit for message sequence depth could range from 50,000 to 50,000,000 for many systems, and lower or greater ranges for other systems and applications.

The significance and advantage of tracking both the message depth and the sequence depth is that now two dimensions of message performance may be tracked and message issuance limited on a per program module basis. With reference again to the message sequences 300 in FIG. 3, operating system 110 may track the issuance of messages in the following manner: msg11 may be received from an external device, processor, program module or any apparatus, a message depth counter 310 and sequence depth counter 320 within operating system 110 are initialized with a value of 1, indicating the initial depth of operations.

Accordingly, when a subsequent message, msg21, issues from msg11, the message depth counter (MDC) 310 is incremented to indicate the transition to the new message sequence-2 depth 302. All messages, e.g., msg21 and msg22, in that message sequence depth will have the same MDC 310 value, which in this example is two. Since msg21 is the first message at that depth, any subsequent messages generated or issued at that depth will have an incremental-message sequence number, e.g., msg 22. In other words, the aforementioned sequence depth counter (SDC) 320 is incremented. A subsequent message at the same layer or level, e.g., as msg31 and msg32, would have the reference designator msg33, the MDC 310 indicating a depth level of three and the SDC 320 indicating a sequence depth of three.

When a message causes the issuance of another message to an external device, processor, program module or any external apparatus, the message depth counter 310 stops for that particular message sequence. If operating system 110 issues one or more messages for its own purpose, sequence depth counter 320 is not incremented for an operating system initiated message sequence. As previously described, when a message is issued which involves a timer operation, i.e., the action or execution thread associated with the message goes to a time queue within operating environment 100 for delayed continuation, the sequence depth counter 320 is stopped for messages which later issue from the suspended operation.

To further appreciate the advantages of the present invention, operating system 110 may be configured to take certain action when limits are reached. When a message is delivered to an external device, processor, program module or any apparatus, sequence depth counter 320 is compared with a warning limit or threshold set in operating system 110. Such a limit may be in the form of a warning counter or the like. If the sequence depth of the message, as counted in sequence depth counter 320, is less than the warning limit set in operating system 110, the message will be delivered to the external device, processor, program module or apparatus. If, on the other hand, the sequence depth of the message, as counted in sequence depth counter 320, is equal to or greater than the warning limit set by operating system 110, the message will be recorded as a faulty message, but is nonetheless delivered to the program.

When the sequence depth of the message is equal to or greater than the hard limit set by operating system 110, the message will be recorded as a faulty message, the message will be discarded by the operating system 110, and if necessary, the message sequence is aborted by operating system 110. In the case of a program module for example which is issuing a continuing stream of message which exceed the sequence depth limit, the execution of the program module may be terminated by operating system 110.

As previously described, the warning limit counter and hard limit counter in operating system 110 may be changed. Moreover, the list of faulty messages may be stored in a conventional manner by the operating system and later used to analyze the faulty sequence. Appropriate action may be taken or, for example, faulty programming code in the system may be thus identified using such a recorded list. The teachings of the present invention may greatly enhance the capability of a computer or communication system which is in accordance therewith.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method for tracking message generation in a communications system, said method comprising the steps of:

initializing at least one operational parameter at the start of a given procedure, a first said operational parameter being a message depth counter;

incrementing, after the start of said given procedure, said message depth counter upon the subsequent generation of each of a plurality of messages in said communications system; and adjusting a sequence depth counter upon the subsequent generation of a message at a different sequence queue depth, the respective message depth counter values for messages generated at a given sequence queue depth being incremental values from one another.

2. The method according to claim 1, wherein said step of incrementing is performed until said message depth counter reaches a warning limit value, said method further comprising the step of:

warning, after said message depth counter reaches said warning limit value, said communications system.

3. The method according to claim 2, further comprising the step of:

generating a warning report.

4. The method according to claim 1, wherein said step of incrementing is performed until said message depth counter reaches a predetermined limit value, said method further comprising the step of:

discarding, after said message depth counter reaches said predetermined limit value, a plurality of said messages.

5. The method according to claim 4, further comprising the step of:

generating a sample report comprising a portion of at least one of said messages.

6. The method according to claim 4, further comprising the step of:

inhibiting said given procedure from generating further messages.

7. The method according to claim 4, further comprising the step of:

terminating said given procedure.

8. A communications system for controlling message generation in the operation of a given procedure, said communications system comprising:

initialization means for initializing at least one operational parameter at the start of said given procedure, a first said operational parameter being a message depth counter; and incrementing means for incrementing said message depth counter, after the start of said given procedure, upon the subsequent generation of each of a plurality of messages in said communications system; wherein said incrementing means, after the start of said given procedure, adjusts a sequence depth counter upon the subsequent generation of a message at a different sequence queue depth, the respective message depth counter values for messages generated at a given sequence queue depth being incremental values from one another.

9. The communications system according to claim 8, further comprising:

comparison means for comparing the value within said message depth counter to a warning limit value; and warning means for warning said communications systems if said message depth counter value reaches said warning limit value.

10. The communications system according to claim 9, further comprising:

report generation means for generating a warning report.

11. The communications system according to claim 8, further comprising:

comparison means for comparing the value within said message depth counter to a predetermined limit value; and discarding means for discarding a plurality of said messages if said message depth counter reaches said predetermined limit value.

12. The communications system according to claim 11, further comprising:

sample report generation means for generating a sample report comprising a portion of at least one of said messages.

13. The communications system according to claim 11, further comprising:

inhibition means for inhibiting said given procedure from generating further messages.

14. The communications system according to claim 8, further comprising:

termination means for terminating said given procedure.

15. The communications system according to claim 14, wherein said termination means is selected from the group consisting of an operating system extension, an operating system module, a subroutine and a system function.

16. The communications system according to claim 8, wherein, after said incrementing means reaches a given warning limit value for said given sequence queue depth, a warning means warns said communications system.

17. The communications system according to claim 8, wherein after said incrementing means reaches a predetermined limit value for said given sequence queue depth, a discarding means discards a plurality of said messages.

18. The communications system according to claim 8, wherein, after said sequence depth counter reaches a sequence depth limit, a warning means warns said communications system.

19. The communications system according to claim 8, wherein, after said sequence depth counter reaches a sequence depth limit, a discarding means discards a plurality of said messages.

20. The communications system according to claim 8, wherein said message depth counter is selected from the group consisting of hardware registers, software variables and hardware counters.

21. The communications system according to claim 8, wherein said communications system is a computer.

* * * * *